Jan. 19, 1932.  E. H. BLATTNER  1,842,007
RAILWAY TRUCK
Filed March 31, 1930  2 Sheets-Sheet 1

INVENTOR
Emil H. Blattner
BY
ATTORNEY

Jan. 19, 1932.  E. H. BLATTNER  1,842,007
RAILWAY TRUCK
Filed March 31, 1930   2 Sheets-Sheet 2
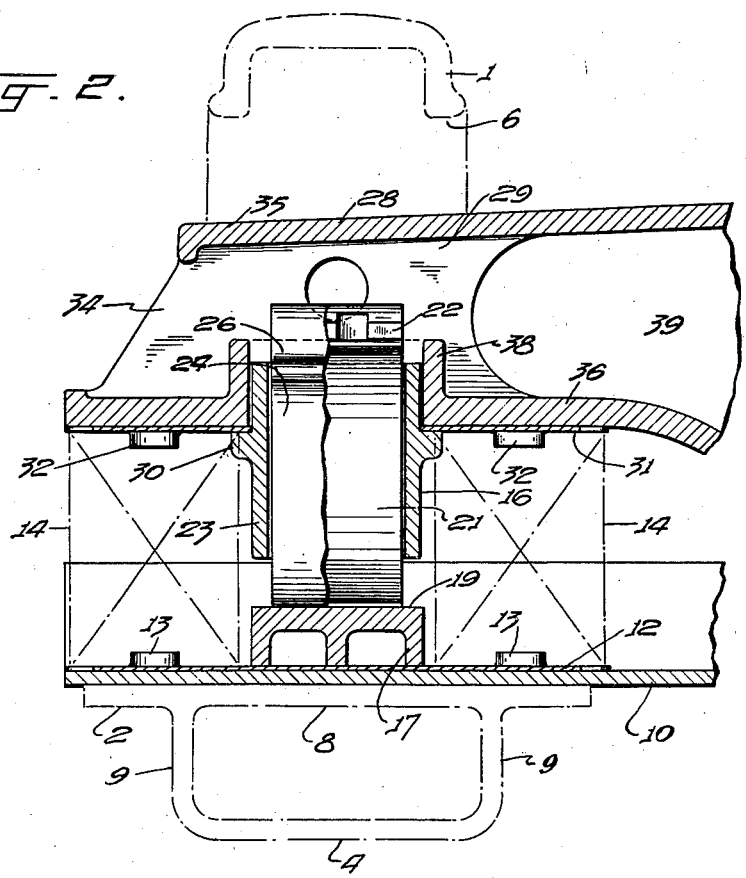
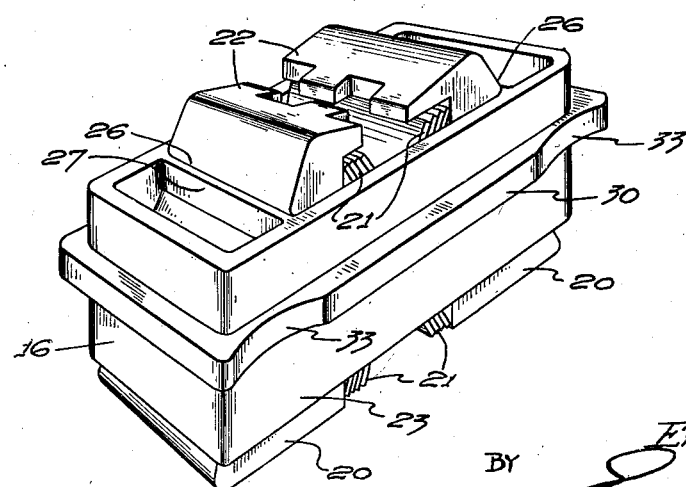
INVENTOR
Emil H. Blattner
BY
ATTORNEY Patented Jan. 19, 1932

1,842,007

UNITED STATES PATENT OFFICE

EMIL H. BLATTNER, OF ROCHESTER, NEW YORK, ASSIGNOR TO THE GOULD COUPLER COMPANY, OF NEW YORK, N. Y., A CORPORATION OF MARYLAND

RAILWAY TRUCK

Application filed March 31, 1930. Serial No. 440,362.

This invention relates to railway trucks, and more particularly to a friction unit for supporting the truck bolster, said friction unit being substituted for one or more of the usual bolster springs.

The principal object of my invention, generally considered, is to provide a friction unit adapted to support or assist in the support of a bolster from an associated truck side frame whereby the capacity of the truck is increased, while at the same time means is provided for snubbing or dampening the roll of the associated car body.

Another object of my invention is to provide a bolster friction unit or cushioning device, the upper element of which supports the bolster, and the lower element of which rests on the side frame or associated spring plank or plate, said lower element having a top surface supporting friction wedges urged apart and into engagement with the upper friction element by preferably curved plate springs.

A further object of my invention is to provide a friction unit for increasing the capacity of a nest of bolster supporting springs, said bolster being preferably cored or provided with a pocket for receiving the upper portion of said unit, the lower element of said unit desirably interlocking with respect to the associated frame.

A still further object of my invention is to provide a bolster friction unit involving a friction plate or adapter which rests on and preferably interlocks with an associated lower spring plate and plank which, in turn, interlocks with the frame, friction wedges for engagement therewith and encircled by a friction shell which directly supports the bolster, the ends of said wedges preferably projecting beyond said shell into the bolster and having shoulders interlocking with respect to said shell to hold the parts in assembled relation.
Other objects and advantages of the invention relating to the particular arrangement and construction of various parts will become apparent as the description proceeds.

Referring to the drawings illustrating my invention, the scope whereof is defined by the appended claims:—

Fig. 2 is a vertical, sectional view of the bolster, spring plank and friction unit disposed therebetween, taken transversely of the associated frame, said frame being diagrammatically illustrated.

Fig. 4 is a perspective view of the friction unit removed from the frame.

Figure 1:
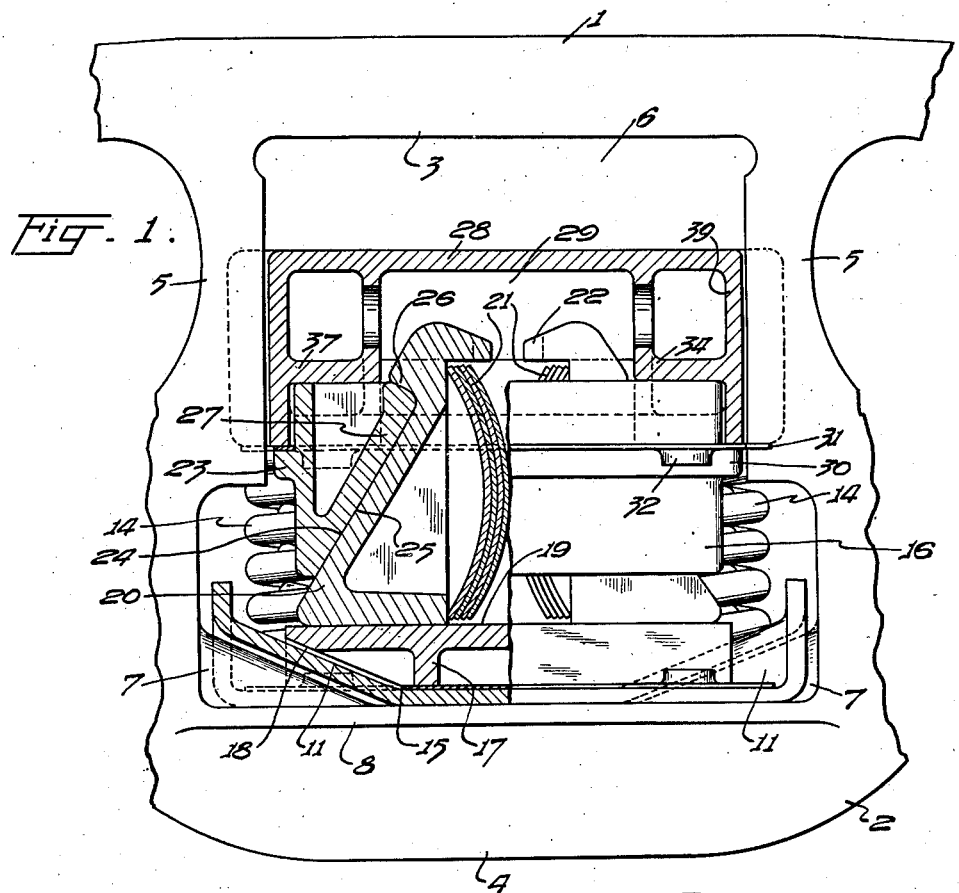
Figure 1 is a fragmentary side elevation of a railway truck embodying one form of my friction unit for supporting an associated bolster and increasing the capacity of a nest of bolster springs.

Referring to the drawings in detail, like parts being designated by like reference characters, there is shown a portion of a railway truck 1 involving a pair of side frames 2, only a fragmentary portion of one of which is illustrated. Each side frame preferably comprises a compression member 3, a tension member 4, and bolster guide columns 5 spacing intermediate portions of said members, leaving a window or bolster opening 6 therebetween. The frame illustrated is one of the double truss type such as described and claimed in the Barrows Patent No. 1,652,808, of December 13, 1927. It will be obvious, however, that I do not wish to be limited to the use of my invention with such a type of frame. In accordance with said patent, the frame 2 has diagonal reinforcing members or portions 7 cutting across the lower corners of the window opening 6 and preferably formed as upward embossments of the spring plank seat portion 8 or upper web of the tension member 4 and disposed along the longitudinal center line of the frame. Said reinforcing members preferably extend from intermediate portions of the upper web 8, or adjacent a central portion thereof, upwardly and longitudinally of the frame to join and pass beyond the bolster guide columns 5, as more completely described in the patent referred to.

In order to provide adequate spring seating area for the bolster springs, the tension member is desirably formed with the upper web 8 laterally widened beyond the flanges or uprights 9 of the tension member, as shown particularly in Fig. 2. Resting on the upper web 8, which forms the spring plank seat portion, is normally disposed a spring plank 10 which is preferably formed to correspond generally with the spring plank of the patent referred to, that is, it is upwardly corrugated or embossed, as indicated at 11, to accommodate the diagonal reinforcing portion 7 of the frame and results in an interlocking connection between said spring plank and the associated frame. Although only one end of the spring plank is illustrated, it will be understood that the other end may be correspondingly formed to interlock with the other side frame of the truck.

The spring plank 10 may accommodate a spring plate 12, if desired, and said plate is preferably formed with upstanding spring positioning collars 13 of usual construction for properly positioning the associated spring units 14. The spring plate 12 may be formed with correspondingly embossed portions to interlock with the spring plank, or may be cut away, as indicated at 15, to clear the embossed portions 11 of the plank, said plate, however, preferably snugly fitting the embossed portions of the plank so that it interlocks therewith. If desired, the plate may be omitted and the plank formed to properly position the springs, which are preferably standard bolster or G springs, and may be single or double coil, in accordance with the capacity desired.

For increasing the capacity of the nest of springs, I preferably employ a friction unit 16 disposed centrally of the spring units 14. Although said friction unit is shown disposed on the longitudinal center line of the frame and the center line of the associated bolster, it will be understood that I do not wish to be limited to this exact position of the unit, as it may be differently arranged with respect to the springs 14, and, if desired, I may use more than one friction unit.

Figure 3:
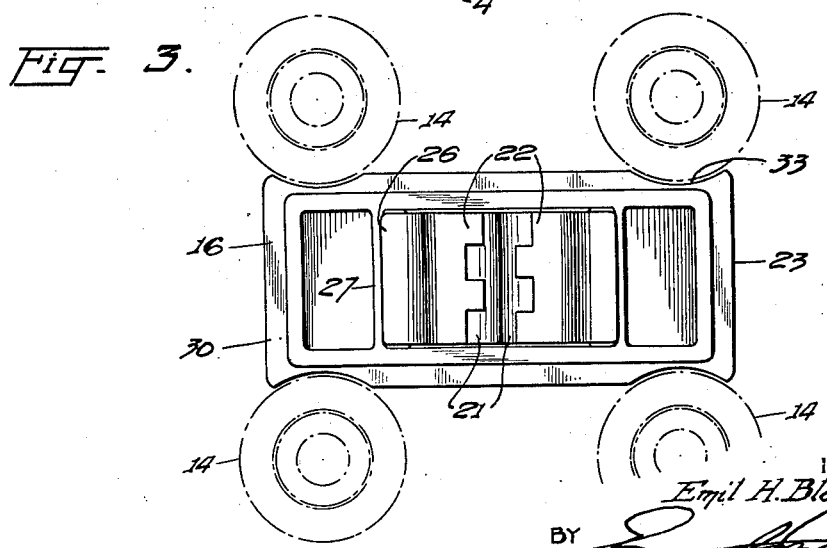
Fig. 3 is a plan of the friction unit shown in Figs. 1 and 2 removed from the frame, the associated springs being diagrammatically illustrated.

Each friction unit 16 preferably comprises a lower friction plate or adapter 17 which is preferably notched, as indicated at 18, to interlock with respect to the associated side frame reinforcements 7 and the corresponding corrugations or embossments 11 on the spring plank whereby it is properly positioned with respect to the frame and plank. The plate or adapter 17 desirably presents an upper surface 19 upon which rest the wedges 20 with the large ends or lower surfaces thereof in frictional engagement therewith. Said wedges are urged apart by resilient means 21 which desirably take the form of curved plate springs. Said springs are maintained in proper position by the friction plate 17 below and flanges 22 extending toward each other above, and involving a plurality of spaced portions which are staggered, as shown most clearly in Figs. 3 and 4, so that upon movement of the wedges toward one another, said flanged portions interfit and permit such movement to the desired extent.

Embracing the friction wedges 20 is an upper friction element 23 providing inclined friction surfaces 24 normally in engagement with the friction surfaces 25 on the wedges. In order to hold the wedges in proper assembled relation with respect to the friction element 23, shoulders 26 are provided on the small or upper ends of said wedges which normally engage the upper ends of the inclined walls 27 of the friction element 23 on which the friction surfaces 24 are formed.

The associated bolster 28 is desirably provided with a downwardly opening pocket 29 receiving the upper end of the upper friction element 23 and the small ends of the wedges 20 which extend beyond the upper surface of the friction element 23. The lower surface of the bolster is desirably supported on an outstanding flange or rib 30 formed around the entire periphery of the friction element 23, an upper spring plate 31 being desirably disposed between said flange and the lower surface of the bolster 28 and formed like the lower spring plate 12 with spring positioning collars 32. The rib 30 is desirably cut away, as indicated at 33, to permit closer spacing of the springs 14. The ends of the bolster may have vertical reinforcing webs 34 extending longitudinally thereof between the upper wall 35, the lower wall 36, and an intermediate web 37 which is discontinued between the webs 34 to provide the upper extension of the pocket 29 receiving the ends of the wedges 20. The web 37 may be adapted to normally rest on the top of the friction element 23. The lower portion of the pocket 29 is defined by webs 38 extending between the side walls 39 of the bolster.

From the foregoing disclosure, it will be seen that I have devised a friction unit admirably adapted to increase truck capacity by augmenting the strength of associated bolster spring units. On account of the energy-absorbing capacity of such a friction unit, it is adapted to act as a snubber or dampener of spring reaction, and thereby prevent excessive rolling of an associated car body. It will be understood that although I have shown my friction unit associated with a certain group of spring units, the same is merely illustrative and not limiting. It will also be understood that my friction unit is adapted for use with other types of frames than the one here illustrated and may be combined with the associated bolster in a different manner, if desired, and that I do not wish to be limited to the details disclosed as modifications may be made within the spirit and scope of the appended claims.

I claim:—

1. In a railway truck, in combination, a side frame having compression and tension members spaced at intermediate portions by bolster guide columns leaving a window opening therebetween, that portion of the tension member beneath the window opening being laterally widened for supporting bolster springs, and reinforced by inclined members extending upwardly and outwardly from intermediate portions to the guide columns, and a bolster supporting friction unit comprising a friction plate resting on and interlocking with respect to the inclined reinforcing members, a pair of wedge blocks resting thereon, curved plate springs disposed between said wedge blocks for urging them apart, and an upper friction element encircling said wedge blocks and adapted to support an associated bolster, the upper ends of said wedge blocks extending beyond the supporting surface of said upper friction element.

2. In a railway truck, in combination, a side frame comprising compression and tension members spaced at intermediate portions by bolster guide columns leaving a window opening therebetween, that portion of the tension member beneath the window opening being adapted to support bolster springs, diagonal reinforcing portions extending across the corners of the window opening between the tension member and bolster guide columns and disposed along the longitudinal center line of the frame, and a friction cushioning unit supported in the window opening by means of the tension member, said unit comprising a friction plate supported by means of the tension member and notched to fit over said reinforcing portions, a pair of friction wedges disposed in frictional engagement with said plate, resilient means disposed between said wedges for urging them apart, an upper friction element encircling said wedges and providing inclined friction surfaces in engagement therewith, said upper friction element having an upper surface adapted for the support of an associated bolster.

3. In a railway truck, in combination, a side frame comprising a compression member, a tension member, bolster guide columns spacing intermediate portions and leaving a window opening therebetween, a four-unit nest of springs resting on said tension member beneath the window opening and arranged in rectangular formation, and a friction unit centrally disposed with respect thereto for increasing the capacity, said friction unit comprising a lower friction plate supported by means of the tension member, friction wedges with their large ends resting on the upper surface of said plate, curved plate springs disposed between said wedges for urging them apart, and an outer friction element encircling said wedges and formed with an outstanding flange adapted for the support of an associated bolster.

4. In a railway truck, in combination, a side frame having compression and tension members spaced at intermediate portions by bolster guide columns, leaving a window opening therebetween, and a bolster supporting friction unit in said window opening, said unit comprising a friction plate supported by means of said tension member, a pair of wedge blocks with the lower surfaces of the large ends thereof resting directly thereon, curved plate springs disposed between said wedge blocks for urging them apart, and an upper friction element encircling said wedge blocks and adapted to support an associated bolster.

5. In a railway truck, in combination, a side frame comprising compression and tension members spaced at intermediate portions by bolster guide columns, leaving a window opening therebetween, a spring plank supported on the tension member beneath the window opening, and a friction cushioning unit supported in the window opening above said spring plank, said unit comprising a friction plate disposed on the plank, a pair of friction wedges in frictional engagement with said plate, resilient means disposed between said wedges for urging them apart, an upper friction element encircling said wedges and providing inclined friction surfaces for engagement therewith, said upper friction element embodying supporting surfaces for an associated bolster.

6. In a railway truck, in combination, a side frame comprising a compression member, a tension member, bolster guide columns spacing intermediate portions of said members and leaving a window opening therebetween, a spring plank with an end resting on said tension member beneath said window opening, a lower friction plate supported by means of said plank in said window opening, friction wedges with their large ends resting on the upper surface of said plate, curved plate springs disposed between said wedges for urging them apart, an outer friction element encircling said wedges and formed with an outstanding flange, and a bolster with a downwardly opening pocket receiving the upper portion of said outer friction element and wedges and resting on said flange.

7. A friction unit adapted to support a truck bolster comprising a friction plate adapted to be supported by and interlocked with respect to an associated side frame, a pair of wedge blocks normally resting on said plate, curved plate springs disposed between said wedge blocks for urging them apart, and an upper friction element encircling said blocks and adapted to support an associated bolster.

8. A friction unit adapted to support a truck bolster comprising a friction plate adapted for reception in the window opening of a side frame and supported on the tension member thereof, a pair of friction wedges normally disposed in frictional engagement with the top surface of said plate, resilient means disposed between said wedges for urging them apart, an upper friction element normally encircling said wedges and providing inclined friction surfaces in engagement therewith, said upper friction element being adapted to directly support an associated bolster.

9. A friction unit adapted to increase the capacity of a nest of bolster springs for supporting a truck bolster from an associated side frame comprising a lower friction plate adapted to rest on the tension member of said frame, friction wedges with their large ends normally resting on the upper surface of said plate, curved plate springs disposed between said wedges for urging them apart, and an outer friction element encircling said wedges, said element having a peripheral outstanding flange adapted to be engaged by an associated bolster for the support thereof, said flange being cut away adjacent the springs to permit the closer spacing thereof.

10. A friction unit comprising a lower friction element presenting an upper flat face, a pair of wedge blocks normally engaging said face, resilient means disposed between said wedge blocks for urging them apart, and an upper friction element engaging said blocks and having an upper surface adapted to support an associated truck bolster.

11. In a railway truck, in combination, a side frame having a bolster opening and a friction unit disposed in said opening and supported by said frame, said unit comprising a lower friction element, a pair of wedge blocks with lower faces engaging said element, resilient means disposed between said wedge blocks for urging them apart, and an upper friction element engaging said wedge blocks and adapted to support an associated bolster.

In testimony whereof I have affixed my signature.

EMIL H. BLATTNER.